United States Patent
Gaudon et al.

(10) Patent No.: US 6,961,639 B2
(45) Date of Patent: Nov. 1, 2005

(54) APPARATUS AND PROCESS FOR IDENTIFICATION OF CHARACTERS INSCRIBED ON A SEMICONDUCTOR WAFER CONTAINING AN ORIENTATION MARK

(75) Inventors: Alain Gaudon, Launac (FR); Pierre Astegno, Saint Jory (FR); Mohammed El Jarjini, Toulouse (FR)

(73) Assignee: Recif, Societe Anonyme, Aussonne (FR)

( * ) Notice: Subject to any disclaimer, the term of this patent is extended or adjusted under 35 U.S.C. 154(b) by 0 days.

(21) Appl. No.: 10/353,845

(22) Filed: Jan. 28, 2003

(65) Prior Publication Data

US 2003/0219914 A1 Nov. 27, 2003

(30) Foreign Application Priority Data

Jan. 29, 2002 (FR) ............................................ 02 01032

(51) Int. Cl.$^7$ ................................................ G06F 7/00
(52) U.S. Cl. ........................ 700/225; 414/936; 414/941; 901/47; 700/218
(58) Field of Search ................................ 700/213, 218, 700/259; 414/936, 941; 901/30, 46, 47, 39

(56) References Cited

U.S. PATENT DOCUMENTS

| | | |
|---|---|---|
| 384,939 A | 6/1888 | Stollwerck |
| 440,984 A | 11/1890 | Williams |
| 3,160,295 A | 12/1964 | Roark |
| 3,165,186 A | 1/1965 | Zeiter |
| 3,297,134 A | 1/1967 | Pastuszak |
| 3,480,158 A | 11/1969 | Pandjiris et al. |
| 3,499,560 A | 3/1970 | Le Gros |
| 3,712,483 A | 1/1973 | Messervey |
| 3,820,647 A | 6/1974 | Waugh, Jr. et al. |
| 3,972,424 A | 8/1976 | Levy et al. |

(Continued)

FOREIGN PATENT DOCUMENTS

| | | |
|---|---|---|
| DE | 30 04 462 | 8/1981 |
| DE | 235 156 | 4/1986 |
| DE | 236 714 | 6/1986 |
| EP | 376 160 | 12/1989 |
| EP | 0 445 651 | 7/1992 |

(Continued)

OTHER PUBLICATIONS

Declaration of Laurent Moesle for Response to Office Action.

(Continued)

*Primary Examiner*—Khoi H. Tran
(74) *Attorney, Agent, or Firm*—Townsend and Townsend and Crew LLP (57) ABSTRACT

A device and process are provided for identifying characters inscribed on a semiconductor wafer containing an orientation mark. A semiconductor wafer having characters inscribed on a surface near its periphery is supported about its periphery between three rotary supports mounted on a grasping arm. An orientation mark on the periphery of the wafer is located adjacent the inscribed characters. At least one of the three rotary supports is rotatably driven to orient the wafer such that the orientation mark is placed in a determined position. An optical reflector is positioned in a spatial zone in proximity to and above the characters to be identified. The characters to be identified are illuminated by a light beam reflected by the optical reflector. The characters reflect the light, which may be observed by an optical imager, such as a camera. An optical recognition subsystem may then be used to identify the characters.

41 Claims, 7 Drawing Sheets

U.S. PATENT DOCUMENTS

| | | |
|---|---|---|
| 3,982,627 A | 9/1976 | Isohata |
| 4,094,426 A | 6/1978 | Vogel |
| 4,213,318 A | 7/1980 | Priebe |
| 4,244,673 A | 1/1981 | Henderson |
| 4,407,627 A | 10/1983 | Sato et al. |
| 4,423,998 A | 1/1984 | Inaba et al. |
| 4,427,332 A | 1/1984 | Manriquez |
| 4,436,474 A | 3/1984 | Brossman, Jr. et al. |
| 4,449,885 A | 5/1984 | Hertel et al. |
| 4,466,766 A | 8/1984 | Geren et al. |
| 4,483,434 A | 11/1984 | Miwa et al. |
| 4,536,122 A | 8/1985 | Herrmann et al. |
| 4,568,234 A | 2/1986 | Lee et al. |
| 4,569,625 A | 2/1986 | Dorumsgaard et al. |
| 4,573,851 A | 3/1986 | Butler |
| 4,611,966 A | 9/1986 | Johnson |
| 4,621,967 A | 11/1986 | Masada |
| 4,655,584 A | 4/1987 | Tanaka et al. |
| 4,662,811 A | 5/1987 | Hayden |
| 4,682,928 A | 7/1987 | Foulke et al. |
| 4,685,206 A | 8/1987 | Kobayashi et al. |
| 4,687,542 A | 8/1987 | Davis et al. |
| 4,691,817 A | 9/1987 | Haar |
| 4,695,217 A | 9/1987 | Lau |
| 4,720,130 A | 1/1988 | Andou |
| 4,744,715 A | 5/1988 | Kawabata |
| 4,766,322 A | 8/1988 | Hashimoto |
| 4,775,281 A | 10/1988 | Prentakis |
| 4,787,814 A | 11/1988 | Vaerman |
| 4,806,057 A | 2/1989 | Cay et al. |
| 4,813,840 A | 3/1989 | Prabhakar et al. |
| 4,840,530 A | 6/1989 | Nguyen |
| 4,875,824 A | 10/1989 | Moe et al. |
| 4,887,904 A | 12/1989 | Nakazato et al. |
| 4,892,455 A | 1/1990 | Hine |
| 4,944,650 A | 7/1990 | Matsumoto |
| 4,947,784 A | 8/1990 | Nishi |
| 4,952,115 A | 8/1990 | Ohkase |
| 4,983,842 A * | 1/1991 | Takamine ................ 250/358.1 |
| 4,987,407 A | 1/1991 | Lee |
| 5,015,832 A | 5/1991 | Filipski et al. |
| 5,022,695 A | 6/1991 | Ayers |
| 5,102,291 A | 4/1992 | Hine |
| 5,133,635 A | 7/1992 | Malin et al. |
| 5,265,170 A | 11/1993 | Hine et al. |
| 5,364,222 A | 11/1994 | Akimoto et al. |
| 5,445,486 A | 8/1995 | Kitayama et al. |
| 5,452,078 A | 9/1995 | Cheng |
| 5,511,934 A | 4/1996 | Bacchi et al. |
| 5,513,948 A | 5/1996 | Bacchi et al. |
| 5,538,385 A | 7/1996 | Bacchi et al. |
| 5,697,759 A | 12/1997 | Bacchi et al. |
| 5,741,113 A | 4/1998 | Bacchi et al. |
| 5,831,738 A | 11/1998 | Hine |
| 5,870,488 A | 2/1999 | Rush et al. |
| 5,905,850 A * | 5/1999 | Kaveh ........................ 700/259 |
| 5,917,169 A | 6/1999 | Poli et al. |
| 5,944,476 A | 8/1999 | Bacchi et al. |
| 5,980,187 A | 11/1999 | Verhovsky et al. |
| 5,980,194 A | 11/1999 | Freerks et al. |
| 6,098,484 A | 8/2000 | Bacchi et al. |
| 6,105,454 A | 8/2000 | Bacchi et al. |
| 6,116,848 A | 9/2000 | Thomas et al. |
| 6,188,323 B1 | 2/2001 | Rosenquist et al. |
| 6,256,555 B1 | 7/2001 | Bacchi et al. |
| 6,275,748 B1 | 8/2001 | Bacchi et al. |
| 6,298,280 B1 | 10/2001 | Bonora et al. |
| 6,435,807 B1 * | 8/2002 | Todorov et al. ............ 414/757 |
| 6,438,460 B1 | 8/2002 | Bacchi et al. |
| 6,453,214 B1 | 9/2002 | Bacchi et al. |
| 6,468,022 B1 * | 10/2002 | Whitcomb ................ 414/757 |
| 6,591,960 B2 * | 7/2003 | Babbs et al. ............. 198/346.2 |
| 6,612,008 B1 * | 9/2003 | Thoma .................... 29/402.02 |
| 6,618,645 B2 | 9/2003 | Bacchi et al. |
| 6,652,216 B1 | 11/2003 | Astegno et al. |
| 6,682,113 B2 * | 1/2004 | Cox et al. ................... 294/104 |
| 6,685,422 B2 * | 2/2004 | Sundar et al. ........... 414/744.5 |
| 6,752,585 B2 * | 6/2004 | Reimer et al. .............. 414/783 |
| 6,769,861 B2 * | 8/2004 | Caveney .................... 414/783 |

FOREIGN PATENT DOCUMENTS

| | | |
|---|---|---|
| EP | 0 620 584 A1 | 4/1994 |
| EP | 1 078 391 B1 | 5/1999 |
| FR | 2 567 160 | 1/1986 |
| FR | 2 711 824 | 5/1995 |
| FR | 2 751 769 A1 | 7/1996 |
| FR | 2 751 769 | 1/1998 |
| GB | 1 457 162 | 7/1974 |
| GB | 2 171 978 | 3/1985 |
| JP | 56-043718 | 4/1981 |
| JP | 56-024921 | 10/1981 |
| JP | 58-090735 | 5/1983 |
| JP | 58-144022 | 8/1983 |
| JP | 58-182846 | 10/1983 |
| JP | 59-104138 | 6/1984 |
| JP | 59-228720 | 12/1984 |
| JP | 61-267611 | 11/1986 |
| JP | 61-291335 | 12/1986 |
| JP | 62-004142 | 1/1987 |
| JP | 62-188642 | 8/1987 |
| JP | 02-122541 | 10/1990 |
| JP | 03-052248 | 6/1991 |
| JP | 03-296244 | 12/1991 |
| JP | 06-345261 | 12/1994 |
| NL | 85564 | 7/1957 |
| RU | 879681 | 7/1981 |
| WO | WO 80/00073 | 1/1980 |
| WO | WO 83/04240 | 12/1983 |
| WO | WO 84/04739 | 12/1984 |
| WO | WO 97/45861 | 12/1997 |
| WO | WO 97/45861 A1 | 12/1997 |
| WO | WO 99/57752 | 11/1999 |

OTHER PUBLICATIONS

Declaration and SPP 12 product documents, filed in connection with Recif's U.S. Patent Appl. No. 09/674,613, now U.S. Patent No. 6,652,216, Exhibit A of the Declaration of Laurent Moesle for Response to Office Action, 19 pages total.

Proforma Invoice NBRL2494–06–98 and two pages of air bill documents relating to the importation of one unit of the SPP300A product into the United States in Jun., 1998, Exhibit B of the Declaration of Laurent Moesle for Response to Office Action, 3 pages total.

Facsimile correspondence from Hannah Levy dated Jul. 24, 1998, Exhibit C of the Declaration of Laurent Moesle for Response to Office Action, 1 page total.

IBM Corp., "Semiconductor Transportation Sensing Alignment Technique," Technical Disclosure Bulletin, vol. 20, No. 2, Jul. 1977, pp. 533–534.

Semiconductor Equipment Assessment, "Recif Foup/Open Cassette Sorter, SPP12," Result Bulletin, Bulletin No. 1, Jan. 2000, 2 pages total.

* cited by examiner

APPARATUS AND PROCESS FOR IDENTIFICATION OF CHARACTERS INSCRIBED ON A SEMICONDUCTOR WAFER CONTAINING AN ORIENTATION MARK

BACKGROUND OF THE INVENTION

1. Field of the Invention

The present invention concerns the field of manufacturing electronic components, especially integrated circuits, on substrates or wafers made of semiconductor materials, like silicon, and especially concerns methods and devices for identifying characters inscribed on a semiconductor wafer containing at least one orientation mark.

2. Description of the Art

The prior art teaches several methods and devices for identifying characters inscribed on semiconductor wafers. In particular, a process for identifying characters engraved on substrates in the form of a wafer is known. This process consists of using a manipulator arm to hold a wafer horizontally, the wafer being one of a plurality of wafers arranged to be aligned one behind the other in respective grooves of a vertically arranged carrier, and removing the wafer from the carrier oriented at an angle by means of an orientation mark on its perimeter in the form of a recess or flattened area so as to present a portion of the surface carrying characters to be identified in alignment with the optical axis of a camera and illumination system, especially the latter. This method has as a major drawback the need to remove the wafer from the support for the mere purpose of being identified, and also the drawback of requiring the presence of several elements above the wafer that are capable of contaminating it.

Another approach is known in which the angular orientation and identification of wafers arranged in the same carrier is possible using the same equipment, but here the camera and illumination systems are arranged above the wafers, causing significant air turbulence and thus increasing the risk of contamination of the wafers.

The present applicant has proposed methods and devices that permit elimination of these drawbacks by using a special geometry of illumination and observation of the characters on the semiconductor wafers being identified from below the wafers. Such methods and devices are described, in particular, in French Patent No. 2 711 824. However, these methods and devices, although fully satisfactory, require preliminary alignment of all the wafers in their support.

The prior art also teaches in published PCT Application No. WO 91/10968 methods and devices for identifying characters engraved on wafers using at least one mirror that reflects light rays used to identify the characters. In particular, this document describes an apparatus for identification of characters engraved on silicon wafers aligned in a carrier. In this apparatus, light radiation is reflected by one or two mirrors before illuminating the characters to be identified, and the image of the illuminated characters is then reflected by two mirrors before entering an observation camera. In order to illuminate the characters engraved on a wafer aligned in the carrier, the apparatus contains means to raise the wafer directly in front of the wafer being identified in order to permit placement of a mirror facing the characters. The mirrors are positioned at 45° relative to the plane defined by the wafer. This apparatus has the drawback of requiring manipulation of one wafer in order to permit identification of another wafer, which can cause a risk of contamination of the wafers. Another disadvantage is that identification time is slowed by these manipulations. Moreover, this apparatus uses several mirrors to observe the illuminated characters, which involves increased complexity of the mechanism and a higher selling cost of the apparatus. It can also cause identification errors of the wafers due to multiple reflections of the image on the mirrors before reaching the observation camera The present applicant has proposed methods and devices for identifying the characters of semiconductor wafers that permits elimination of most of the aforementioned drawbacks and that advantageously uses a single reflection mirror. These methods and devices are described in French Patent No. 2 751 769. The methods and apparatuses described in this document permit effective identification of the characters inscribed on a semiconductor wafer without touching either the wafer to be identified or another wafer. This is owing to a specific geometry of illumination and observation, using a mirror to reflect incident light rays on the characters being identified, with the mirror being inserted between two successive wafers from below the wafers. Such methods and devices for identification also are entirely satisfactory. However, similarly to the methods and apparatuses described in the aforementioned French Patent No. 2 711 824, they require pre-alignment of the semiconductor wafers so that the characters being identified are first aligned.

SUMMARY OF THE INVENTION

The present invention seeks to eliminate the drawbacks of the methods and devices of the prior art and to provide other advantages. More precisely, it provides a method for identification of characters inscribed on a semiconductor wafer containing at least one orientation mark and is characterized by supporting the semiconductor wafer at its periphery on a plurality of rotary supports mounted on a wafer grasping arm, orientating the semiconductor wafer by rotating at least one of the rotary supports to position an orientation mark in a determined position, placing a reflector for specific light rays in a spatial zone substantially adjacent to and above the characters to be identified, illuminating the characters to be identified with a specific light beam, which is reflected by the reflector onto the characters to be identified, observing the characters to be identified via the light rays reflected by the reflector, and, identifying the characters.

The process according to the invention, by supporting the periphery of the wafer whose characters are to be identified, rotating or aligning the characters into appropriate position so that they can be identified, and using a reflector that permits identification of the characters, provides an identification process that minimizes the risks of contamination by handling only the wafer being identified, handling the wafer only at its periphery, and combining the alignment and identification of the characters.

According to one advantageous characteristic, a process according to the invention may include supporting a semiconductor wafer at its periphery between a plurality of rotary supports and simultaneously positioning a reflector for light rays in a spatial zone substantially adjacent to and above a location the characters will occupy after orientation of the wafer.

This arrangement saves time, reduces device complexity, and provides a simpler, therefore less costly, and more reliable process, in that a wafer is both grasped and a reflector simultaneously positioned with a single operation.

According to another advantageous characteristic, a process according to the invention may also include positioning a light protection mechanism to protect against parasitic ambient illumination of the characters to be identified, simultaneously with positioning of the reflector in the spatial zone.

This characteristic provides additional efficiency in identification of the characters on the semiconductor wafer without lengthening the time of the process, since the operation for positioning the light protection mechanism is simultaneous with positioning of the reflector.

According to yet another advantageous characteristic, a process according to the invention may also include displacement in space of the semiconductor wafer either after the characters have been identified or simultaneously with either orienting the semiconductor wafer, illuminating the wafer, or observing or identifying the characters to be identified.

This characteristic imparts a high degree of flexibility, since one or more of the characteristic operations can be carried out, for example, during displacement of the semiconductor from one point in space to another.

According to yet another advantageous characteristic, a method according to the invention wherein a semiconductor wafer is to be grasped and supported on its periphery between a plurality of rotary supports mounted on a grasping arm, may include inserting the grasping arm into the immediate proximity of the semiconductor wafer in a semiconductor wafer support by first displacing the arm along at least a first spatial direction, positioning the semiconductor wafer between the plurality of rotary supports by displacing the arm in a second spatial direction, supporting the periphery of the semiconductor wafer on the plurality of rotary supports, identifying characters on the wafer, then removing the reflector from the spatial zone substantially adjacent to and above the characters, releasing the semiconductor wafer from the support position between the plurality of rotary supports, releasing the semiconductor wafer from the grasping arm by displacing the arm in a third spatial direction substantially opposite to the second spatial direction, and retracting the grasping arm from the immediate proximity of the wafer by displacing the arm in a fourth spatial direction substantially opposite the first direction.

The invention also provides a device for identification of characters inscribed on a semiconductor wafer containing at least one orientation mark, which generally employs the process characterized according to the invention, and which is further characterized by a rigid grasping arm containing in a specified plane at least one first and one second rotary support, each possessing at least one degree of freedom in rotation around its axis of symmetry, and a third rotary support also possessing at least one degree of rotational freedom around its axis of symmetry and one degree of freedom in the specified plane, the first, second and third rotary supports adapted to engage and support a semiconductor wafer about its periphery, a drive mechanism to displace the third rotary support in the specified plane, a mechanism to orient the semiconductor wafer, including a drive mechanism to rotatably drive at least one of the first, second or third rotary supports, a reflector for light rays, a drive mechanism to selectively displace the reflector, a source of illumination of the characters to be identified, producing at least one light beam, an imaging mechanism to observe the characters, and a mechanism to identify the imaged characters.

According to one advantageous characteristic, the third rotary support is coupled to the reflector so that the drive mechanism that displaces the third rotary support provides simultaneous displacement of the reflector and vice-versa.

According to another advantageous characteristic, a device according to the invention may comprise a light protection mechanism to protect against parasitic ambient illumination of the characters to be identified, which is coupled to the reflector so that the drive mechanism that displaces the reflector simultaneously displaces the light protection mechanism as well.

According to yet another advantageous characteristic, a device according to the invention may also comprise a drive mechanism to spatially displace the grasping arm.

According to yet another advantageous characteristic, the drive mechanism to spatially displace the grasping arm may comprise a drive to displace the grasping arm along a first spatial direction and its substantially opposite direction, a drive to displace the grasping arm along a second spatial direction and its substantially opposite direction, and a drive to displace the grasping arm along a third spatial direction and its substantially opposite direction.

BRIEF DESCRIPTION OF THE DRAWINGS

Other characteristics and advantages will be apparent upon reading the following exemplary description of a preferred process and device according to the invention, accompanied by the appended drawings, given as non-limiting illustrative examples, in which.

DETAILED DESCRIPTION OF THE PREFERRED EMBODIMENTS

Figure 1:
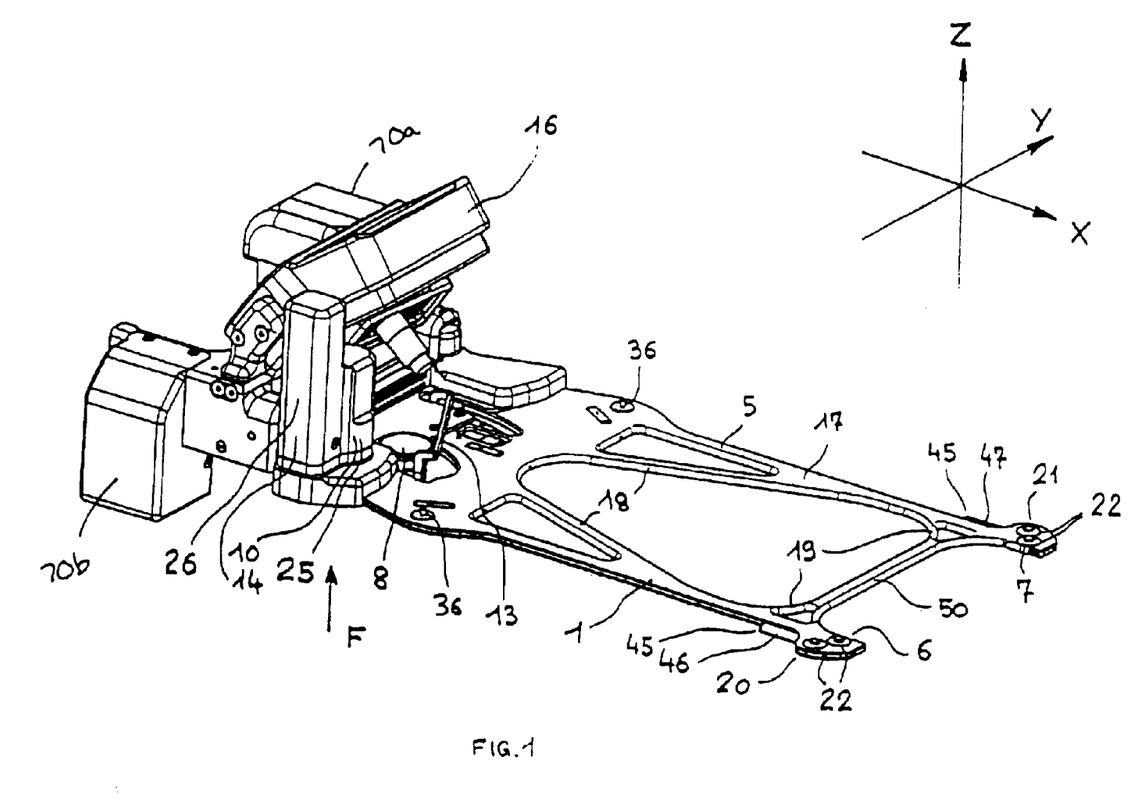
FIG. 1 shows a first perspective view of a preferred device for identifying characters according to the invention in a first functional position.
Figure 2:
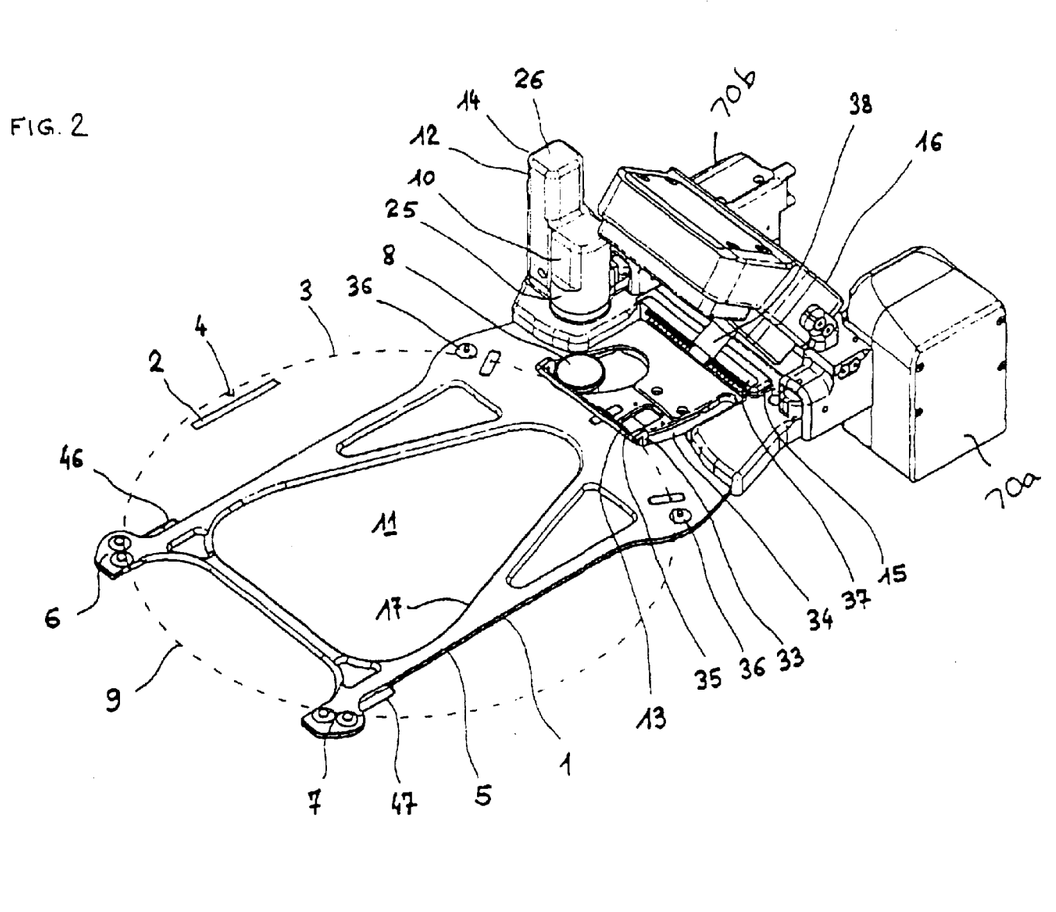
FIG. 2 shows a second perspective view of the device of FIG. 1 from another viewing angle and in a second functional position.
Figure 3:
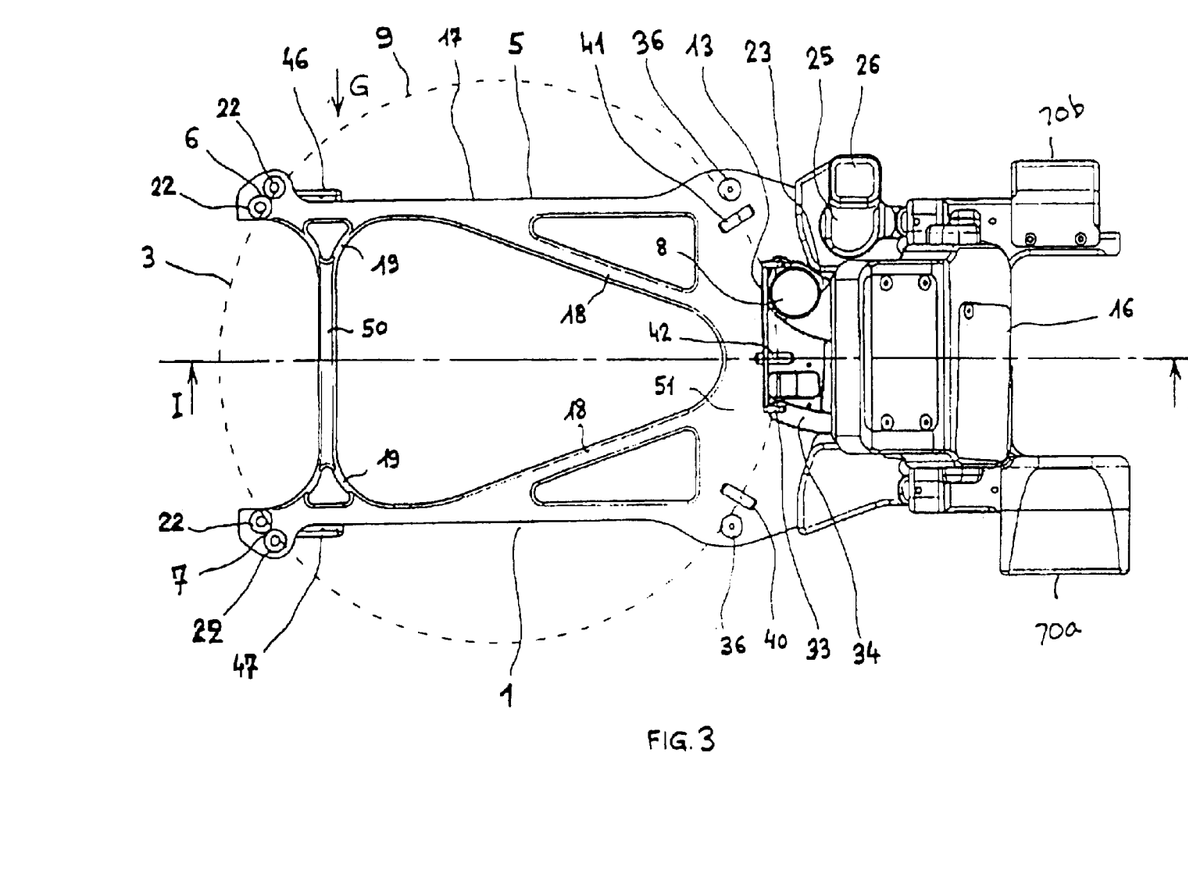
FIG. 3 shows a top plan view of the preferred device shown in FIG. 1.

A presently preferred device 1 for identifying characters inscribed on a semiconductor wafer 3 containing at least one orientation mark 4 is shown in FIGS. 1 to 4. The preferred device 1 comprises a rigid grasping arm 5 in a specified plane 11. First and second rotary supports 6, 7 are each mounted on the grasping arm 5. Each rotary support 6 and 7 possesses one degree of freedom in rotation around its respective axis of symmetry. A third rotary support 8 is also mounted on the grasping arm 5. The third rotary support 8 also possesses one degree of rotational freedom around its axis of symmetry and one degree of freedom of movement in specified plane 11. The first 6, second 7 and third 8 rotary supports cooperate to support a semiconductor wafer 3 about its periphery, as shown in FIGS. 2 and 3.

Figure 4:
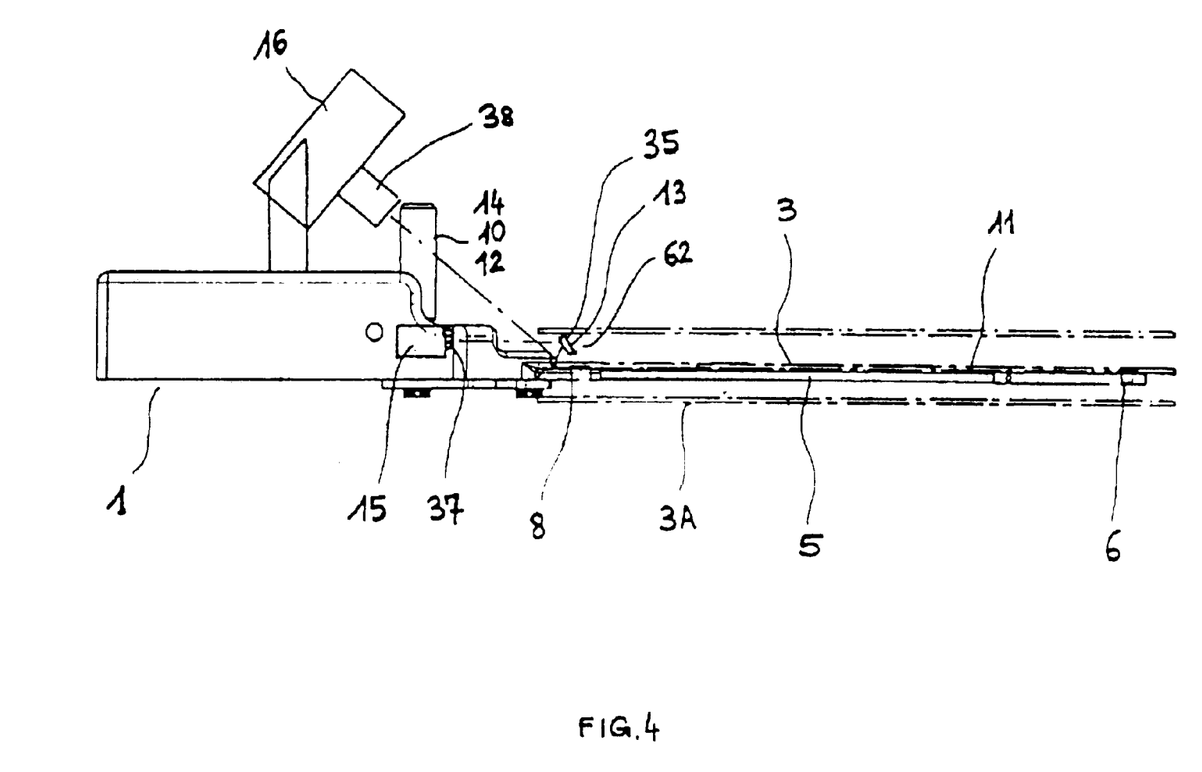
FIG. 4 shows a side elevation in cross section of the preferred device as shown in FIG. 3, taken along line I—I.

The presently preferred device 1 also comprises a drive mechanism 10 which operates to displace third rotary support 8 in specified plane 11, a rotational drive mechanism 12 to rotatably drive third rotary support 8 in order to orient a supported semiconductor wafer 3, a reflector 13, which operates to reflect light rays onto a portion of the semiconductor wafer 3, as shown in FIG. 4, and a drive mechanism 14, which functions to displace the reflector 13. Still further, preferred device 1 comprises a source of illumination 15, which operates to illuminate characters 2 inscribed on a surface of semiconductor wafer 3, and which produces at least one light beam, an imager 16, which operates to observe the characters 2 inscribed on the surface of semiconductor wafer 3, and a character recognition facility, which operates to identify the imaged characters 2 inscribed on the surface of semiconductor wafer 3.

The rigid grasping arm 5 preferably consists of a rigid frame structure 17, for example, a rigid frame or chassis. The structure is preferably machined of low stress, aeronautical grade aluminum, preferably coated with oxidated anodized sulfur (OAS) and PTFE. Various other materials would also be suitable, including machined, uncoated stainless steel, various ceramics, anodized aluminum, silicon-carbon compounds, and carbon fiber composites, which could be press molded and painted with an epoxy. The structure as shown in the figures is preferably hollowed out in order to reduce its weight, and has exposed surfaces to which the different elements forming the device, as just identified, are connected, as will be explained below.

In a preferred embodiment, the rigid structure 17 essentially adopts the external shape of a hollowed-out rectangle with fixed dimension and can have internal reinforcement ribs 18, 19 in the corners, as shown in FIG. 1. Rigid structure 17 preferably extends parallel to specified plane 11, which can represent the plane of the surface of semiconductor wafer 3, and has at least one dimension or side of the rectangle, which is substantially co-extensive with the wafer surface. This permits placement of rotary supports 6, 7 and 8 so that the semiconductor wafer 3 is supported between them at its periphery, as shown in FIG. 2. Preferably, rotary supports 6 and 7 are placed substantially at two corners 20 and 21 of the structure 17 at opposite ends of a first small side 50 of the rectangle. Rotary support 8 is preferably positioned on a second small side 51 of the rectangle opposite the first small side 50, so that when the rotary support 8 is in contact with and supporting the periphery of semiconductor wafer 3, a force is exerted on the periphery of wafer 3 directed toward the two supports 6 and 7, so that the wafer is held between the three rotary supports 6, 7 and 8. The second small side of the rectangle 51 also facilitates rigid connection of the grasping arm 5 to a drive mechanism, which can operate to displace the arm in three spatial dimensions X, Y, Z. This connection may be made in any known fashion, for example, by a rigid connection to a driven support for the mobile arm, which is capable of displacing the arm in the perpendicular spatial directions X, Y, Z. Although rigid structure 17 is illustrated as having a particular shape, the particular shape shown is exemplary and many other shapes and configurations including various other geometric shapes, may be alternatively employed.

Further, while a particular three-dimensional drive for the grasping arm is not shown, various suitable drives are well known. One example is the three-dimensional drive shown and described in the present assignee's own pending U.S. patent application Ser. No. 09/674,613 entitled Method And Device For Changing A Semiconductor Wafer Position, which is incorporated herein by reference.

Supports 6 and 7 are preferably mounted on bearings or rollers so that they are free to rotate substantially in the specified plane 11. These supports 6 and 7 may each advantageously consist of two adjacent wheels 22, as shown in FIG. 1, in order to further increase the rotational guiding stability of wafer 3. Each of supports 6 and 7, or wheels 22 forming them, preferably have an axis of rotation that is substantially vertical, and an appropriate circular rolling tread so that, when wafer 3 rotates with its periphery supported on the rolling treads of the supports 6, 7, it will not separate unexpectedly from the rolling treads. The supports may be suitably machined of a PEEK or PETP compound, preferably formulated to be static dissipative and relatively strong.

The rolling treads (not shown) may, for example, comprise a relatively soft rubber material that encircles or encompasses the supports 6, 7 where they contact the periphery of the semiconductor wafer to provide a frictional interface between the two surfaces when in contact.

The "periphery" of the semiconductor wafer, as used herein, encompasses its outer edge and the circular or essentially circular part, which is continuous or almost continuous (because of the presence of the orientation mark) which extends about the outer edge of the wafer. The "periphery" as used herein, excludes any substantial position of the upper and lower surfaces of the wafer upon which electronic structures may be fabricated.

Figure 8:
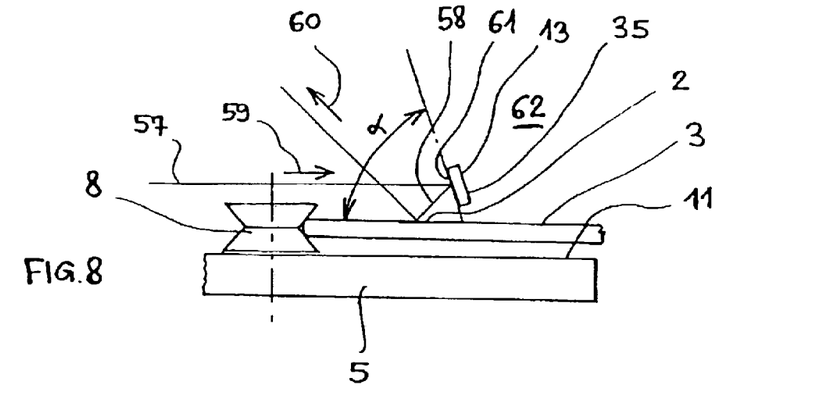
FIG. 8 shows an enlarged detailed view of a portion of the preferred device as shown in FIG. 4.
Figure 9:
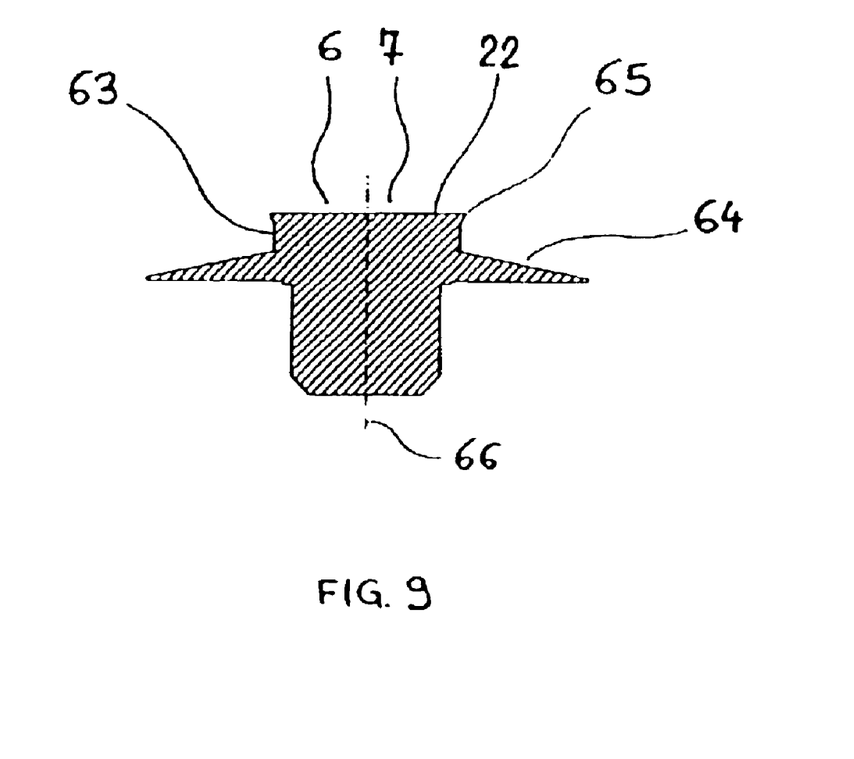
FIG. 9 shows an axial cross section of an enlarged detail of the preferred device as shown in FIG. 1.

FIG. 9 depicts an example of a wheel 22 of a rotary support 6, 7 in axial cross section. Wheel 22 has a vertical axis of rotation 66 and a rolling tread 63 with a vertical generatrix. The rolling tread acts as a support for the edge of a roller and preferably has an upper return 65, serving to prevent release of the wafer upwardly beyond the rolling tread when the three supports 6, 7 and 8 are supporting the periphery of the wafer. Rolling treads 63 are also preferably provided with a lower return 64 at the bottom of the rolling tread, which prevents release of the wafer downwardly beyond the rolling tread and guides the semiconductor wafer 3 when it is supported on the rolling tread under the influence of the force of rotary support 8, as shown in FIGS. 8 and 9.

Rotary support 8 is mobile and facilitates rotational entrainment of the wafer between the three rotary supports 6, 7, 8. Support 8 adopts two positions in the specified plane 11. As shown in FIG. 1, in a first position it is separated from the periphery of wafer 3, thus permitting positioning of arm 5 and the three rotary supports 6, 7 and 8 around the periphery of wafer 3 without touching it. As shown in FIG. 2, after a displacement of grasping arm 5 along direction Z perpendicular to plane 11, the rotary support 8 adopts a second position, in which it is urged against the periphery of wafer 3 in order to permit rotational entrainment of the wafer 3 by adherence thereto. Rotary support 8 advantageously has a circular rolling tread with a cross section forming a groove, for example a "V", as shown in FIG. 8, so that the semiconductor wafer 3 is naturally made to temporarily roll, essentially helically, upon its edge contacting the groove until it enters the base of the groove and settles into a stabilized rotational position, thus avoiding unintentional release of the wafer beyond the rolling tread during rotation. Making the rolling tread in a "V" shape thus permits the upper and lower branches of the "V" to impart the respective upper and lower return movements described above with reference to the supports 6 and 7 to the wafer. Alternatively, it has been found that if the rolling tread is formed in a rounded "U" shape, the wafer positioning benefits of the "V" shape may still be obtained, and in addition better contamination results may be achieved by reducing the generation of contaminant particles from contact between the rotary support and the wafer edge. In either configuration, rotary support 8 is suitably fabricated by molding and/or machining a urethane material, preferably having hardness in the range of approximately 75 to 90 shore.

Figure 5:
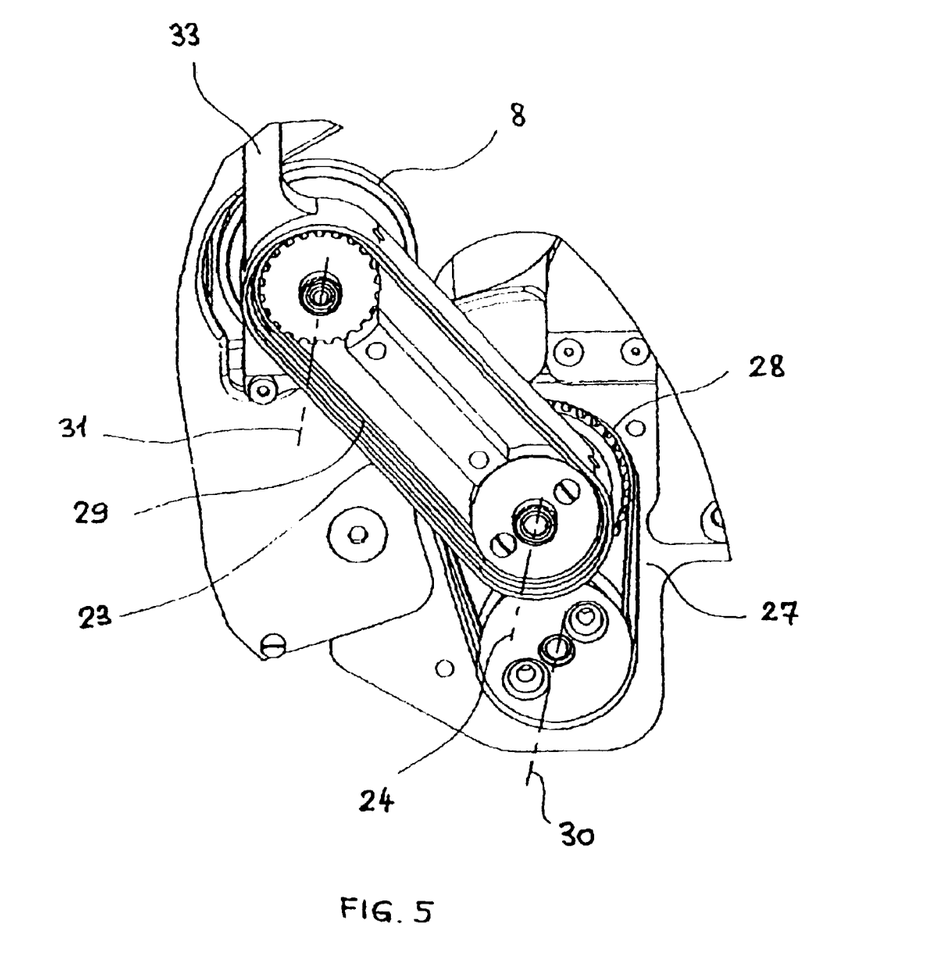
FIG. 5 shows an enlarged detailed partial view of the bottom of the preferred device of FIG. 1 along direction F.

FIG. 5 shows the details of the drive mechanism 10, which operates to displace the third rotary support 8 in specified plane 11 between the first and second positions. The drive mechanism comprises a lever 23, on one end of which rotary support 8 is mounted to rotate freely about axis 31. The other end of the lever 23 is mounted for rotation around axis 24, which is controlled by a lever drive motor 25 for rotationally driving lever 23. When the motor 25 is activated, it causes the lever 23 to rotate and urge mobile support 8 against the periphery of the wafer, preferably with substantially constant pressure rather than constant position. This is intended to ensure better mobility of rotary support 8 and flexibility for use with wafers that may have slight diameter variations, while still providing a constant clamping pressure to the wafer edge. Control of the motor 25 for driving lever 23 to carry support 8 against the periphery of wafer 3 is preferably accomplished by controlling the drive current of motor 25, which then functions on direct current, thus permitting control of support 8 with a substantially constant controlled pressure. It should be noted that control of mobile support 8 can alternately be carried out by other means, for example, by a pneumatic cylinder or with springs, however, in these cases control is not necessarily carried out at constant pressure. It is noted that according to the present preferred embodiment, mobile support 8 is displaced in plane 11 in the form of an arc of a circle, the axis of rotation 24 of lever 23 and the axis of rotation 31 of support 8 being perpendicular to plane 11. It should also be noted that approach of the support 8 against the periphery of the semiconductor wafer 3 occurs in two phases, in order to reduce the impact of the support against the wafer, which is quite delicate. During the first phase of the approach, the lever drive motor 25 is preferably controlled positionally using a "pole placement law" approach to position the support 8 into the immediate proximity of the theoretically expected edge location of the semiconductor wafer, preferably about 1 mm from the theoretical edge location. Any error in the positioning of the support 8 may be detected as a "lost set point" error from a computed movement curve of the support 8, or by sensing an over-current condition of the motor 25, which for example could be defined as current draw exceeding approximately 80% of the motor's rated maximum current draw. During the second phase, the support 8 enters into contact with the periphery of the wafer, and preferably remains urged against it with substantially constant pressure during rotation of the wafer. During this phase, the drive current to the motor 25 is preferably controlled to be at a constant value irrespective of the actual position of the support 8. Since the torque delivered by the motor depends on the drive current, controlling the drive current to the motor to remain at a substantially constant value causes the motor to urge the support against the periphery of the wafer at a substantially constant pressure Preferably the force applied is sufficient to rotate the wafer without slippage, but not so great as to cause the generation of contaminant particles due to excessive contact force between the support 8 and the edge of the wafer.

In order to accommodate the control approach described above, motor 25 is preferably a direct current motor having an associated position encoder and drive current sensor. A suitable motor is available from Minimotor, S. A. of Croglio, Switzerland as model 1724T-024S, with a Minimotor planetary gearbox model 16/7-43:1 having a 24 tooth primary axis pulley, 35 tooth secondary axis pulley, and 2.5 mm pulley pitch, and a Minimotor encoder motor model 21B22 encoding 16 points per revolution for a total of 64 points per revolution of the motor 25. Drive current sensing may be by any suitable means.

In order to orient semiconductor wafer 3, a second drive mechanism 12 for rotatably driving the third rotary support 8 comprises a second motor 26, together with transmission 27, including belts 28, 29. Motor 26 is rigidly attached on arm 5 on the side of motor 25 on the second small side of the rectangle forming rigid structure 17 of arm 5. Motor 25 is also rigidly fixed on arm 5 as shown in FIGS. 1 to 3. As shown in FIG. 5, transmission 27 contains two successive belts 28 and 29, first belt 28 transmitting the rotary movement about axis 30 of motor 26 to pivot axis 24 of lever 23, and second belt 29 transmitting the rotary movement about pivot axis 24 of lever 23 to rotational axis 31 of support 8. It should be noted that mobile support 8 is preferably already being rotated before coming into contact with the periphery of wafer 3 in order to avoid shifting of the semiconductor wafer at the bottom of the groove after contact between the rolling tread of rotary support 8 and the periphery 9 of wafer 3. Thus, wafer 3 will be positioned on the bottom of the groove of support 8 by a progressive helical movement, as explained above, avoiding abrupt shifting of the wafer, which would occur if support 8 were placed in rotation after its contact with the periphery of semiconductor wafer 3.

A suitable motor is available from Minimotor, S. A. of Croglio, Switzerland as model 1624E-024S, with a Minimotor planetary gearbox model 16/8-22:1 having a 20 tooth primary axis pulley, 22 tooth secondary axis pulley, and 2.5 mm pulley pitch, and a Minimotor encoder motor model 21B22 encoding 16 points per revolution for a total of 64 points per revolution of the motor 26.

Also advantageously provided to assist orienting the semiconductor wafer 3 are three position detectors 40, 41, 42, which detect the positions of a notch 4 in the periphery of wafer 3. The notch 4 provides an orientation mark for the wafer. The three position detectors 40, 41, 42 preferably are light beam detectors, each having a light beam emitter and receiver and functioning according to well known principles of light beam reflection and detection for such detectors. The detectors are preferably mounted on rigid structure 17 at locations having a generally circular relation with a diameter slightly less than the diameter of wafer 3 in order to detect the presence of the surface of wafer 3. Also preferably, the detectors are mounted along the second small side of the rectangle forming rigid structure 17, as shown in FIG. 3, for example. This is the location where the orientation mark of wafer 3 is preferably detected. First detector 40 and second detector 41 are respectively preferably positioned near opposite corners of the second small side of the rectangle, and third detector 42 is preferably placed between the first and second detectors, exactly at the location where notch 4 of the wafer 3 is desired to be placed for identification of the characters on the wafer. The detectors 40, 41 and 42 are preferably fixed on rigid structure 17, so that when the notch passes over one of the detectors during rotation of the wafer, the light beam emitted by the detector traverses the recess and is thus no longer reflected by the wafer. The detector's receiver thus no longer receives the reflected light rays and produces a signal indicating the position of the notch to a central control unit (not shown). The central control unit records the position and determines the action to be taken. In this case, central detector 42 permits stopping the rotation of the wafer by stopping drive motor 26 from rotatably driving rotary support 8, and lateral detectors 40 and 41 permit deceleration of the wafer when the recess passes over one of these lateral detectors. Thus, the lateral detectors, without being essential, advantageously permit wafers to be rotated at a higher angular velocity until they approach the desired stopping point. Alternatively, optical imager 16 can be used instead of central detector 42. In this alternative, an optical camera 38 may be used to detect the position of the notch instead of the central detector, and to thus permit stopping the rotation of the wafer when the notch is detected to be precisely at the desired location for identification of the characters on the wafer.

The optical reflector 13 preferably comprises a plane mirror, the surface area of which essentially corresponds to and is preferably slightly greater than the surface area containing the characters being identified on semiconductor wafer 3, e.g., in the preferred case an essentially rectangular surface whose length is large relative to the width. Reflector 13 is preferably connected to displacement lever 23 of mobile support 8 at a small end of its rectangular structure by means of a rigid connection, thus permitting precise transmission of the movement of lever 23 to reflector 13. Thus, in the first position of mobile rotary support 8, which is removed from the periphery of wafer 3, reflector 13 is preferably positioned beyond the portion of the surface of the rigid structure reserved for the wafer, as shown in FIG. 1. In the second position of mobile rotary support 8, in which the rotary support is abutting the periphery of wafer 3, reflector 13 is preferably positioned in a spatial zone 62 essentially in proximity to and above the characters being identified, as shown in FIGS. 2–4. In this manner, mobile support 8 and reflector 13 are moved together from a first inactive position to a second active position, in which the wafer can be rotated and the characters identified. It will be further noted that when mobile support 8 is to abut and support the periphery of the semiconductor wafer, movement is also imparted to the reflector 13 connected to the support to also locate it in a precise position relative to said semiconductor wafer in order to identify the characters.

In the depicted example, the mechanism for displacing the reflector 13 preferably comprises lever 23 and motor 25, which rotates the lever 23. In its first, inactive position, reflector 13 is preferably positioned precisely to permit a Z movement of the arm in order to support a wafer 3 between the three rotary supports 6, 7 and 8. Reflector 13 must be positioned so as to not present an obstacle during this displacement, and as a result must be situated at a location outside the perimeter of the wafer. In its second, active position, the reflector 13 is positioned as a function of the location of the characters inscribed on semiconductor wafer 3 to permit illumination of these characters, as explained below. In the present case, the characters are generally inscribed along one chord of the circular periphery of wafer 3 in a zone close to the periphery. Reflector 13 in this case is preferably situated in its second position with its longer side parallel to this chord and essentially above the characters, the periphery of the wafer being defined on device 1 by the circle tangent to the three supports 6, 7 and 8. Support 8 is then also in its second position abutting against the periphery of the wafer. In its second position, the longer side of reflector 13 is preferably substantially parallel to the small side of the rectangle forming rigid structure 17. As shown in FIG. 2, the orientation mark 4 is preferably effectively situated on the periphery of the wafer and centered with respect to the inscribed characters. The orientation mark is rotated to a determined observation position, in which the characters preferably are substantially parallel to the shorter side of the rectangle forming rigid structure 17 and the longer side of the plane mirror of reflector 13. The inclination of the plane mirror relative to plane 11 will be explained below in connection with the geometry of illumination with reference to FIG. 8.

As shown in FIGS. 1 and 2, lever 23 connects to reflector 13 on the top surface of rigid structure 17 whereas lever 23 and the belts for transmission 27 are connected on the surface of rigid structure 17 opposite that receiving semiconductor wafer 3. In order to ensure the stability of reflector 13 with respect to vibrations, especially in its second position, its second shorter side is also preferably rigidly fixed to lever 23 by means of a fixation tab 33, which traverses rigid structure 17 and connects the second, shorter side of the mirror to lever 23. If the rigid structure is solid at this site, an elongated hole 34 corresponding to the desired displacement of the fixation tab 33 at the site where it traverses the rigid structure is made so as to permit angular movement of the mirror between the first and second positions.

As is apparent, third rotary support 8 is provided with two degrees of freedom in plane 11 and is coupled to the reflector 13 so that when the drive for the third rotary support 8 displaces it between the first and second positions, it simultaneously displaces the reflector 13 between the first and second position also, and vice versa.

The preferred device shown in the figures also contains a light protector 35, which shields parasitic illumination of characters 2 being identified. The light protector 35 is preferably coupled to reflector 13 so that the drive 14 simultaneously displaces both the reflector and the associated light protector. A difficulty in identifying characters inscribed on wafers is eliminating parasitic ambient illumination from the environment in which device 1 is found, especially parasitic illumination of the characters coming from the same side as the intended illumination. For this purpose, the mirror of reflector 13 advantageously contains on the face opposite its reflective face for the intended illumination of the characters, a screen which presents an obstacle to most of the ambient light rays illuminating the characters being identified, and which forms a shadow zone on these characters. The screen preferably comprises an opaque material on the face of the mirror opposite the reflecting face. Coupling of the light protector and the reflector permits displacement of the two simultaneously whenever one is displaced. However, a separate hood or housing could also be provided about the mirror to prevent ambient illumination of the characters to be identified.

It should be noted that rigid arm 5 advantageously has two additional supports comprising two fixed supports 36 placed essentially on the ends of the second small side of rigid structure 17, as shown in FIGS. 1 and 2. Supports 36 provide further support to the rear edge of the periphery of a wafer before it is urged between the three rotary supports 6, 7 and 8. For this purpose, each of stops 36 preferably contains a lower truncated part, on which the lower edge of the wafer is positioned, and a central part that permits the wafer to be guided on the lower truncated part during Z displacement of the arm 5 to position the wafer between the three rotary supports.

The source of illumination 15 of the characters 2 inscribed on semiconductor wafer 3 preferably provides, in known fashion, at least one specific light beam emitted by one or more light emitting diodes 37, as shown in FIG. 2, for example, a red or infrared light beam distinct from the ambient light. Preferably the light beam does not contain any ultraviolet wavelength components so as not to interfere with any photosensitive resist materials that may be present on the wafer. The source of illumination preferably includes a number of such light emitting diodes 37 that emit light rays 47 in a direction 59 essentially parallel to plane 11 from a location behind the small side of the rectangle formed by rigid structure 17, as shown in FIG. 2. As shown in FIG. 8, the light rays 57 emitted by diodes 37 are reflected by the reflecting face of the mirror of reflector 13 when it is situated in the second position, as described above. The second position is defined so that the rays 57 emitted by the diodes are reflected onto the characters 2 inscribed on wafer 3. The rays 58 reflected by the mirror onto the characters 2 are then reflected by the latter to optical imager 16, which may contain a camera 38, which is sensitive to the wavelength of the light rays emitted by diodes 37. Both the optical imager 16 and the source of illumination 15 are preferably rigidly fixed to rigid structure 17 behind the small side of the rectangle formed by this structure, as shown in FIG. 2. For this reason, as shown in FIG. 8, reflector 13 in its second position is preferably situated beyond the characters 2 and toward the front of arm 5 so that the reflected light rays 58 fall on the characters 2, which are situated toward the rear of structure 17, and then reflected from the latter in the direction 60 toward the rear of the structure 17 to the optical imager 16, which is located rearwardly in the vicinity of the area from which the light rays 57 are emitted. For this purpose, the reflecting face 61 of the mirror of reflector 13 preferably has an inclination angle relative to plane 11 greater than about 45°. This arrangement permits attachment of the source of illumination 15 and the optical imager 16 on the same small side of the rectangle formed by rigid structure 17, and leaves the rigid structure free of obstructions and able to penetrate between two adjacent semiconductor wafers 3 and 3A, positioned successively in a support, as shown in FIG. 4.

A device embodying the invention may include means for identifying the characters (not shown), based on the image observed and transmitted to the latter by the optical imager 16, including observation camera 38. The means for identifying the characters may comprise any known means, including in particular image processing software such as optical character recognition (OCR) software. Alternatively, the function of identifying the characters can be accomplished by means of an electronic circuit containing a neural network processor of the ZISC (Zero Instruction Set Computer) type. Such technology is available from a variety of sources, including General Vision, Inc. of Petaluma, Calif. The image processing software or neural network advantageously permits the reflected image to be broken down, recognized, and displayed so that an operator can identify the characters, for example, by means of a monitor (not shown).

The exemplary device shown in FIGS. 1 to 5 also advantageously contains a position detector 45 that permits positioning arm 5 in the immediate vicinity of a semiconductor wafer in a semiconductor wafer support. The position detector 45 includes two detectors 46, 47 that function on the principle of reflection of light rays. Each detector contains an optical emitter 52 and receiver 53, and functions in similar fashion to the detectors 40, 41 and 42 described above. However, the arrangement of emitter 52, receiver 53 and the light rays on one of the detectors 46, 47 varies from that described with respect to detectors 40, 41 and 42, as will be explained below.

Figure 6:
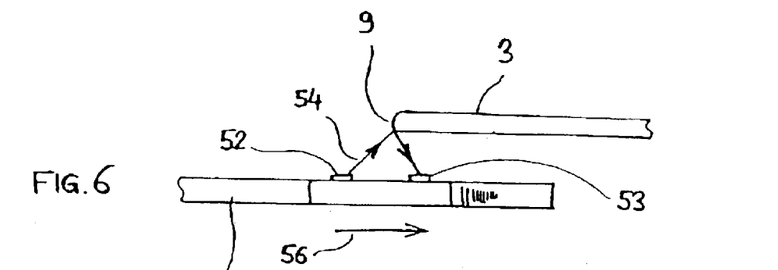
FIG. 6 shows a partial side elevation view in detail of the preferred device as shown in FIG. 3, along direction G.
Figure 7:
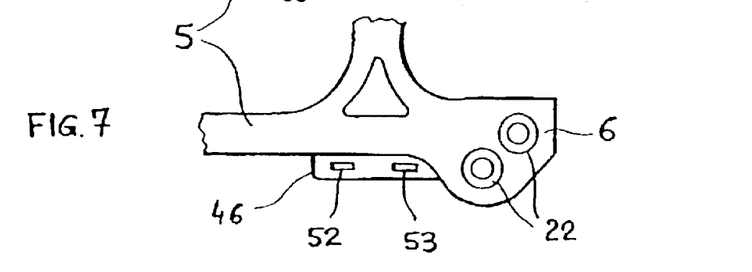
FIG. 7 shows an enlarged top plan view in detail of the preferred device as shown in FIG. 6.

The two detectors 46 and 47 are advantageously essentially positioned toward the two ends of the first small side 50 of the rectangle forming rigid structure 17 in an area close to rotary supports 22, shown in FIGS. 1 to 3. The two detectors 46 and 47 function to detect the position of the wafer bearing characters to be identified. The dimensions of the wafer, especially the diameter, are known in order to control the displacement of the arm 5 into the appropriate position for holding the wafer. Thus, each of the detectors 46 and 47 furnishes a positioning point of the wafer. With the additional knowledge of the wafer's diameter, this permits an exact determination of the position of the wafer in a support so that the arm may then be precisely positioned at the desired site in the immediate vicinity of the wafer in the support containing it. Each detector 46, 47 therefore contains an optical emitter 52 that emits at least one light beam 54 inclined in the direction 56, which corresponds to the direction of displacement of arm 5 toward the front, as shown in FIG. 6. Optical receiver 53 is placed to the front of the optical emitter 52 so that it receives the light beam 54 reflected by the edge of wafer 3 when the edge of the wafer intercepts the beam 54 as a result of displacement of the arm in the direction 56, as shown in FIG. 6. When optical receiver 53 of one of the detectors 46 or 47 receives the beam reflected by the wafer, a control unit (not shown) records the receipt and determines a first positioning point of the wafer. When the optical receiver 53 of the second receiver 46 or 47 also receives the beam reflected by the wafer, the control unit (not shown) also records this receipt and determines a second positioning point of the wafer. Using these two positioning points, and since the diameter of the wafer is known, the control unit may control the drive that displaces the grasping arm at least according to a first direction Y, so as to position the arm in the immediate vicinity of the semiconductor wafer positioned in a semiconductor wafer support. This is because the distance between the detectors and the rotary supports is known precisely and the diameter of the wafer is known. Once the location of the edge of the wafer is known, the control unit can easily calculate the distance to displace the arm 5 so that the rotary support will engage an edge of the wafer. Thus, from knowledge of the positioning of the wafer and the relative position of the arm, a first displacement of the arm near the wafer can be carried out in a combination of X and Y directions in space to align the arm with a wafer to be supported. Then the control unit can control the grasping arm drive to move the grasping arm in a second spatial direction Z in order to position the semiconductor wafer between the three rotary supports 6, 7, 8 and the fixed supports 36. In this position, the wafer is supported on the lower returns of the rotary supports 6 and 7 at its periphery, as well as by mobile rotary support 8, when in its second, displaced position, as explained above.

As described previously, an exemplary device according to the invention will also advantageously comprise a drive system (not shown) to displace in space the grasping arm along the three spatial directions X, Y, Z. For this purpose, the grasping arm as described above and shown in FIGS. 1 to 3 is preferably connected rigidly in known fashion to an arm support (not shown) which is mobile in space in the three directions X, Y and Z, for example, perpendicularly to each other.

The central control unit (not shown) of the exemplary device shown in the figures coordinates control of the rotation of mobile rotary support 8, joint displacement of this support 8 and the associated reflector 13 in the plane 11, as explained above, activation of the source of illumination 15, detectors 40, 41, 42, 46, 47, and optical imager 16 and observation camera 38, identification of the characters, and displacement of the arm in space according to a specified character identification process as a function of the requirements, all as explained above. The central control unit and associated electronics may be mounted in housings 70a and 70b as best shown in FIGS. 1–3. The central control unit preferably comprises a 16-bit microprocessor and interface circuitry for providing commands to and reading data from the various motors. Such interface circuitry is conventional and well known to those skilled in the art and need not be described in detail. Although the interface circuitry may be fabricated as discrete components, it is preferred to employ field programmable gate arrays (FPGA's) in order to reduce weight, size and cost. Generally, the FPGA's will preferably implement quadrature decoders for the various motors, which can be commanded and read by the microcontroller. In addition, the FPGA's will preferably implement motor current limitation detection as previously described. This may be accomplished using National Semiconductor LMD18200T motor drivers and Linear Technology Corporation LTC1098 analog to digital converters, or similar components, such that the microprocessor is able to command the FPGA's to read the drive current of a given motor and the FPGA's will return a digital value representing the current. Additionally, the interface circuitry also preferably includes conventional I/O interfaces permitting the microprocessor to communicate with and control the source of illumination 15, detectors 40, 41, 42, 46, 47, and optical imager 16 and observation camera 38. Also preferably, the microprocessor will have an RS232 interface in order to receive commands and to receive and send data to and from a host such as a personal computer.

An example of a preferred method of operation according to the invention will now be described. This method can be employed by the exemplary device according to the invention described above. A preferred process for identification of characters 2 inscribed on a semiconductor wafer containing orientation mark 4 thus includes the following steps. First, the grasping arm 5 equipped with three rotary supports 6, 7 and 8 are inserted in the immediate vicinity of a semiconductor wafer 3, which is positioned horizontally in a semiconductor wafer support (not shown), by first displacing the arm along a first perpendicular direction Y and a third perpendicular direction X in space, said first Y and third direction X defining a displacement plane between two successive, adjacent horizontal wafers in the wafer support. The arm 5 is then displaced along a second spatial direction Z, perpendicular to the plane defined by the Y and X directions so as to position the semiconductor wafer 3 between the three rotary supports 6, 7 and 8 so that the wafer is supported on the lower returns of rotary supports 6 and 7, and the fixed supports 36 support the lower edge of the periphery of the wafer. The mobile support 8 is then displaced from its first position away from the wafer to its second position abutting the periphery of the wafer in a plane parallel to the wafer so that the three rotary supports 6, 7 and 8 of the grasping arm 5 support the periphery of semiconductor wafer 3. Simultaneously with the first displacement of mobile support 8 a reflector 13 is positioned in a spatial zone 62 essentially adjacent to and above the position that characters 2 will occupy after orientation of the wafer, i.e., a spatial zone 62 that permits transmission of specific light rays onto the characters, opposite the spatial zone close to the position that the same characters will adopt but situated on the opposite side of wafer 3. Simultaneously with positioning the reflector 13 in spatial zone 62, a light protector 35 is positioned to prevent ambient parasitic illumination of the characters to be identified. The semiconductor wafer 3 is then oriented by rotating rotary support 8 around its axis of symmetry so as to position orientation mark 4 in its specified position in which the means of illumination are capable of illuminating the characters to be identified. The characters 2 to be identified are illuminated by a specific light beam that is generated by a source of illumination and reflected by the reflector 13 onto the characters. The characters to be identified are imaged by the light rays reflected by the latter by means of an optical imager, including an observation camera, which is sensitive to the wavelengths of the light rays of the specific light beam. The characters are identified by means of the image supplied by the optical imager and observation camera. The semiconductor wafer 3 is then released from the three rotary supports 6, 7 and 8 and simultaneously the reflector 13 is positioned beyond the spatial zone 62 essentially adjacent to and above the characters, to enable arm 5 to be freely displaced in the opposite direction of the second displacement of the arm along the Z direction, and mobile support 8 to be freely displaced opposite the first displacement of this support brought against the periphery of wafer 3. The semiconductor wafer 3 is then released from the grasping arm 5 by a third displacement of the arm according to a third direction opposite the second spatial direction Z, so that the wafer rests again in its support. The grasping arm 5 is withdrawn from the immediate vicinity of wafer 3 by a fourth displacement of the arm in a fourth direction opposite the first direction Y.

The preferred process can also include movement in space of the semiconductor wafer, after its characters have been identified, using wafer arm 5 before releasing wafer 3, for example, to a support other than the one in which the wafer is held, or simultaneously with execution of one of the steps consisting of orientation of the wafer, illumination, observation or identification of the characters.

What has been described are exemplary embodiments of a device and method of operation according to the present invention. The foregoing descriptions are not intended to limit the scope of the invention, unless otherwise expressly stated, and persons skilled in the art will realize numerous variations may be made while retaining the objectives, characteristics and features of the invention and without departing from the spirit or scope thereof, which is intended to be defined solely by the appended claims.

What is claimed is:

1. A process for identifying characters inscribed on a semiconductor wafer containing an orientation mark, comprising:

supporting a semiconductor wafer about its periphery between a plurality of rotatable supports connected to a wafer grasping arm, said semiconductor wafer having an orientation mark and having characters inscribed on a surface thereof relative to said orientation mark;

orienting said semiconductor wafer by rotating at least one of said supports so as to position said orientation mark in a specific position;

positioning a reflector in a spatial zone substantially adjacent to and above said characters, said reflector being adapted to reflect light having specific characteristics;

illuminating said characters using a light beam having said specific characteristics and reflected onto said characters by said reflector;

imaging said characters using light reflected from said characters; and identifying said characters from an image thereof.

2. The process of claim 1 wherein the steps of supporting said wafer and positioning said reflector are carried out substantially simultaneously.

3. The process of claim 2 including positioning a light protector to protect against ambient parasitic illumination of said characters substantially simultaneously with the steps of supporting said wafer and positioning said reflector.

4. The process of claim 1 including displacing said semiconductor wafer in space after identifying said characters.

5. The process of claim 3 including displacing said semiconductor in space substantially simultaneously with at least one of the steps of orienting said semiconductor wafer, illuminating said characters, and identifying said characters.

6. The process of claim 1,
wherein the step of supporting said semiconductor wafer includes:

positioning said wafer grasping arm in the immediate proximity of said semiconductor wafer while said wafer is positioned in a semiconductor wafer support by displacing said wafer grasping arm in a first spatial direction to insert said wafer grasping arm in said support;

positioning said wafer grasping arm such that said semiconductor wafer is positioned between said plurality of rotatable supports by displacing said wafer grasping arm in a second spatial direction substantially perpendicular to said first spatial direction; and displacing at least one of said rotatable supports such that said semiconductor wafer is supported between said plurality of rotatable supports;

and including the following additional steps after the step of identifying said characters:

removing said reflector from said spatial zone substantially adjacent to and above said characters;

displacing said at least one rotatable support to release said semiconductor wafer from being supported between said plurality of rotatable supports;

releasing said semiconductor wafer from said grasping arm by displacing said grasping arm along a third spatial direction substantially opposite to said second spatial direction; and withdrawing said grasping arm from the immediate vicinity of said semiconductor wafer by displacing said arm in a fourth spatial direction substantially opposite to said first spatial direction.

7. A device for identifying characters inscribed on a semiconductor wafer containing an orientation mark, comprising:

a rigid wafer grasping arm containing in a specified plane at least three rotatable wafer supports, each being rotatable about its axis of symmetry, and at least one also being displaceable in at least one direction in said specified plane, said supports being arranged to support a semiconductor wafer about its periphery between them, said semiconductor wafer having an orientation mark and having characters inscribed on a surface thereof relative to said orientation mark;

a first drive operable to selectively displace said at least one of said rotatable supports in said specified plane;

a second drive operable to selectively rotate said at least one rotatable wafer support while said semiconductor wafer is supported between said rotatable supports to orient said wafer in a specified position relative to said orientation mark;

a source of illumination for generating at least one light beam having particular characteristics;

an optical reflector adapted to reflect said light beam having particular characteristics onto said characters inscribed on said surface of said semiconductor wafer when said semiconductor wafer is in said specified position relative to said orientation mark;

a third drive operable to selectively to displace said optical reflector relative to said semiconductor wafer;

an optical imager for imaging said characters via light reflected from said characters; and a character recognition facility for identifying said characters.

8. The device of claim 7 wherein said character recognition facility comprises a human readable display permitting identification of characters displayed thereon.

9. The device of claim 7 wherein said character recognition facility comprises neuronal net character recognition circuitry for automatically identifying said characters.

10. The device of claim 7 wherein said optical imager comprises an observation camera.

11. The device of claim 7 wherein said first drive is operable to selectively displace said at least one rotatable support between a first position removed from said wafer and a second position in contact with the periphery of said wafer.

12. The device of claim 7 wherein said third drive is operable to selectively displace said optical reflector between a first position removed from said wafer and a second position in substantial proximity to and above said characters inscribed on said wafer.

13. The device of claim 12 including an ambient light protector connected to said optical reflector and arranged to protect said characters from being illuminated by ambient parasitic light, and said third drive being operable to simultaneously displace said optical reflector and said ambient light protector.

14. The device of claim 13 wherein said optical reflector comprises a plane mirror having a reflective side and a side opposite said reflective side, and wherein said ambient light protector comprises a screen on said side of said plane mirror opposite said reflective side.

15. The device of claim 7 including a drive system for displacing said grasping arm spatially.

16. The device of claim 15 wherein said drive system includes:

a drive connected to and operable to selectively displace said grasping arm along a first spatial direction and the opposite of that direction;

a drive connected to and operable to displace said grasping arm along a second spatial direction and its opposite direction; and a drive connected to and operable to selectively displace said grasping arm along a third spatial direction and its opposite direction.

17. The device of claim 16 wherein said first and second spatial directions are substantially in said specified plane.

18. The device of claim 17 wherein said first, second and third spatial directions are substantially perpendicular to each other.

19. The device of claim 16 wherein said drive system is operable simultaneously with at least one of said second drive, said source of illumination, said optical imager and said character recognition facility.

20. A wafer grasping arm, comprising:
- a rigid frame having a proximal end adapted to be connected to a grasping arm drive and a distal end;
- a plurality of rotatable wafer supports mounted on said frame at selected locations to support a wafer only at the periphery thereof, at least one of said wafer supports being driven, and at least one of said wafer supports being movable from a first position removed from said periphery of said wafer to be supported to a second position in contact with said wafer to grasp said wafer between said plurality of wafer supports;
- a light source mounted on said frame;
- an optical reflector mounted on said frame and adapted to cooperate with said light source to illuminate a selected area of said wafer;
- an optical imager mounted on said frame and adapted to receive light reflected from said selected area of said wafer;
- a first optical position detector mounted on said frame and operable to determine the radial location of a position mark on the periphery of said wafer while said wafer is supported on said rotatable wafer supports; and
- a second optical position detector mounted on said frame and operable to detect the periphery of said wafer during relative movement between said frame and said wafer in a selected direction.

21. The wafer grasping arm of claim 20 wherein said optical reflector comprises a plane mirror having an area approximately the size of said selected illuminated area of said wafer.

22. The wafer grasping arm of claim 20 including:
- a movable support mounting said optical reflector to said rigid frame;
- said movable support selectively movable to move said optical reflector between a first position removed from said periphery of said wafer and a second position in proximity to said selected area of said wafer to be illuminated; and
- a drive coupled to said mobile support and selectively operable to cause said optical reflector to move between said first and second positions.

23. The wafer grasping arm of claim 22 wherein:
- said movable support mounts said optical reflector to said rigid frame near said proximal end of said rigid frame;
- said first position of said optical reflector removed from said periphery of said wafer is near said proximal end; and
- said second position in proximity to said selected area is above said area and closer to said distal end of said rigid frame than said selected area.

24. The wafer grasping arm of claim 23 wherein:
- said light source is mounted on said rigid frame at said proximal end thereof removed from said periphery of said wafer; and
- said light source is oriented to direct light at said optical reflector in said second position, and said optical reflector is oriented to redirect said light to illuminate said selected area of said wafer.

25. The wafer grasping arm of claim 24 wherein said light source is oriented to direct light in a plane substantially parallel to and above said wafer and said optical reflector is oriented to redirect said light downwardly at a selected angle to said selected area of said wafer.

26. The wafer grasping arm of claim 25 wherein said selected angle is greater than approximately 45 degrees.

27. The wafer grasping arm of claim 25 wherein:
- said optical imager is mounted on said frame at said proximal end of said frame and is oriented to receive the light from said light source as redirected by said optical reflector to said selected area of said wafer, and reflected from said selected area.

28. The wafer grasping arm of claim 27 wherein said optical imager is mounted substantially vertically above said light source at said proximal end of said frame.

29. The wafer grasping arm of claim 22 wherein said drive is coupled to said at least one wafer support being movable from a first position removed from said periphery of said wafer to be supported to a second position in contact with said wafer and is operable to selectively concurrently move said at least one wafer support between its said first position and its said second position, and said optical reflector between its said first position and its said second position.

30. The wafer grasping arm of claim 20 wherein said light source comprises an LED array.

31. The wafer grasping arm of claim 30 wherein:
- said LED array is mounted to said rigid frame at said proximal end thereof; and
- said LED array is oriented to direct light toward said distal end of said rigid frame, substantially parallel to and above the plane of said wafer when supported by said plurality of wafer supports.

32. The wafer grasping arm of claim 20 wherein said light source is operable to generate light in a selected, non-ultraviolet wavelength distinguishable from the ambient light.

33. The wafer grasping arm of claim 32 wherein said optical imager comprises a camera, said camera being specifically sensitive to said selected, non-ultraviolet wavelength.

34. The wafer grasping arm of claim 20 wherein said first optical position detector comprises:
- an optical emitter positioned on a first side of said wafer at said periphery thereof, said optical emitter operable to emit a light beam to intersect the periphery of said wafer when said wafer is supported on said plurality of wafer supports;
- a corresponding optical receiver positioned on a second side of said wafer at said periphery thereof opposite said optical emitter, said optical receiver operable to receive said beam and to generate an electrical signal indicative thereof;
- whereby, when a position mark comprising an opening in said periphery of said wafer is interposed between said optical emitter and said corresponding optical receiver, said optical receiver generates an electrical signal indicating the detection of said position mark and the radial location of said position mark on said periphery relative to said rigid frame.

35. The wafer grasping arm of claim 20 wherein said first optical position detector is mounted on said rigid frame at the proximal end thereof.

36. The wafer grasping arm of claim 35 wherein said first optical position detector is mounted on said rigid frame substantially centered at the proximal end thereof.

37. The wafer grasping arm of claim 35 comprising:

three of said first optical position detectors mounted on said rigid frame at selected locations substantially corresponding to said periphery of said wafer;

each of said optical position detectors being operable to generate a signal when said position mark is detected;

whereby, when said wafer is supported on said plurality of wafer supports and is being radially driven, said first optical position detectors generate a signal when said position mark is detected at a selected location, and when said position mark is detected at another selected location approaching the selected location from either direction.

38. The wafer grasping arm of claim 20 wherein said second optical position detector is mounted in proximity to said distal end of said rigid frame and is operable to detect said periphery of said wafer during relative movement between said rigid frame and said wafer in the X-direction and to generate a signal indicating the detection of said periphery, said signal indicating the relative location of said wafer relative to said rigid frame.

39. The wafer grasping arm of claim 38 wherein said second optical position detector is operable to detect said periphery of said wafer during relative movement between said rigid frame in a first plane and said wafer in a second plane substantially parallel to said first plane.

40. The wafer grasping arm of claim 39 comprising:

two second optical detectors;

each said second optical detector being independently operable to detect said periphery of said wafer and independently generating a signal indicating the detection thereof, whereby two independent signals provide information concerning the orientation of said rigid frame relative to said wafer.

41. The wafer grasping arm of claim 20 wherein said second optical detector comprises:

an optical emitter selectively operable to emit a beam of light and oriented to emit said beam at an angle inclined to the plane of said rigid frame and the plane of said wafer; and an optical receiver selectively operable to receive said beam of light and to generate a signal indicative of said receipt, said optical receiver oriented to receive said beam of light reflected off a surface of said wafer;

whereby as said rigid frame and said wafer approach each other, said beam of light emitted by said optical emitter reflects off said periphery of said wafer and is received by said optical receiver, the resulting signal generated by said optical receiver indicating the detection of said periphery relative to said frame.

* * * * *